June 2, 1953 C. C. EAGLESFIELD 2,640,965

ELECTRIC PULSE CODE MODULATION SYSTEM OF COMMUNICATION

Original Filed Oct. 20, 1949 9 Sheets-Sheet 1

Inventor
C.G. EAGLESFIELD
By Philip M. Bolton
Attorney

June 2, 1953 C. C. EAGLESFIELD 2,640,965

ELECTRIC PULSE CODE MODULATION SYSTEM OF COMMUNICATION

Original Filed Oct. 20, 1949 9 Sheets-Sheet 2

Inventor
C.C. EAGLESFIELD
By Philip M. Bolton
Attorney

ELECTRIC PULSE CODE MODULATION SYSTEM OF COMMUNICATION

Original Filed Oct. 20, 1949 9 Sheets-Sheet 3

Inventor
C.C. EAGLESFIELD
By Philip M. Bolton
Attorney

ELECTRIC PULSE CODE MODULATION SYSTEM OF COMMUNICATION

Original Filed Oct. 20, 1949 9 Sheets-Sheet 4

Inventor
C.C. EAGLESFIELD
By Philip M. Bolton
Attorney

ELECTRIC PULSE CODE MODULATION SYSTEM OF COMMUNICATION

Original Filed Oct. 20, 1949 9 Sheets-Sheet 5

Inventor
C.C. EAGLESFIELD
By Philip M. Bolton
Attorney

Inventor
C.C. EAGLESFIELD
By Philip M. Bolton
Attorney

Inventor
C.C. EAGLESFIELD
By Philip M. Bolton
Attorney

ELECTRIC PULSE CODE MODULATION SYSTEM OF COMMUNICATION

Original Filed Oct. 20, 1949

Inventor
C.C. EAGLESFIELD
By Philip M. Bolton
Attorney

ELECTRIC PULSE CODE MODULATION SYSTEM OF COMMUNICATION

Original Filed Oct. 20, 1949 9 Sheets-Sheet 9

Inventor
C.C. EAGLESFIELD
By Philip M. Bolton
Attorney

Patented June 2, 1953 2,640,965

UNITED STATES PATENT OFFICE 2,640,965

ELECTRIC PULSE CODE MODULATION SYSTEM OF COMMUNICATION

Charles Cecil Eaglesfield, London, England, assignor to International Standard Electric Corporation, New York, N. Y., a corporation of Delaware Original application October 20, 1949, Serial No. 122,385. Divided and this application October 31, 1951, Serial No. 254,362. In Great Britain October 22, 1948

4 Claims. (Cl. 332—11)

The present invention relates to electric pulse code modulation systems of communication.

This application is a division of my prior application Serial No. 122,385, filed October 20, 1949.

Electric pulse code modulation systems hitherto proposed, have been based on the principle of periodically scanning a signal wave in order to determine at regular intervals its amplitude to the nearest step of a scale of amplitudes having a finite number of steps. The corresponding step number is then coded and transmitted to the receiving end by a code group of pulses, and the signal amplitude is built up at the receiver from the coded information obtained from the pulses. This system has a better signal-to-noise ratio than pulse systems in which the information is conveyed by variation in amplitude or timing of the pulses, because the receiver generally only has to recognise the presence or absence of a pulse (or at least it has only to distinguish between a very few different pulse amplitudes) so that noise does not interfere with the reception to the same extent as in the other pulse systems. The advantage is, of course, secured at the expense of a small amount of signal distortion which results from the use of an amplitude scale with a finite number of steps.

In some of these systems the code groups sent out represent the changes in the signal amplitude rather than the absolute values, so that if the amplitude change is less than some specified amount no code group will be sent out.

In all of these systems, however, the pulse code groups are controlled by a periodic generator or by some equivalent arrangement which defines regularly spaced instants at which code groups or pulses may be sent out, although as already stated, in some systems code groups or pulses may not be transmitted at some of these instants. Usually also in these known systems the periodic generator controls the instants at which the signal wave is effectively scanned in order to determine the amplitude with reference to the stepped scale.

The present invention is in principle similar to the above mentioned systems in so far as an amplitude scale having a finite number of steps is used; and in so far as a pulse code is used to convey information as to the signal amplitude; but it differs fundamentally from all these systems in this, that there is nothing periodic either in relation to the scanning of the signal wave or in relation to the instants at which the pulse codes are transmitted. The code groups of pulses are sent out at times determined primarily by the times at which the signal amplitude happens to cross the boundaries between the steps of the amplitude scale, and such times occur in general at irregular intervals and do not exhibit any periodic characteristics.

It is known that conventional pulse code modulation systems give an improvement in signal-to-noise ratio and that the improvement is greater the more pulses there are in the code, the system of the present invention gives an improvement of about the same order, but there is rather a difference in the possible effects of noise; and a false signal could only make a change of one amplitude step.

Having described the invention in general terms, and explained its relation to the known pulse code modulation systems, it can now be stated that the invention provides according to its principal feature, an electric pulse code modulation system of communication comprising means for setting up an amplitude scale having a finite number of discrete steps, means operative upon a change in the signal amplitude which crosses the boundary between one step of the scale to the next, for generating a pulse code indicating whether the change is an increase or a decrease of amplitude, a receiver, and means for transmitting the pulse code over a communication medium to the receiver, the said receiver comprising means controlled by the received pulse code for reconstituting the signal wave.

The invention also covers an electric pulse code generator comprising a cathode ray tube having a target plate having two parallel edges, the width of which plate changes progressively in discontinuous steps from one edge of the plate to the opposite edge, means for causing the cathode ray to produce a fine line across the plate parallel to the said edges, means for applying a signal wave to deflect the beam in a direction perpendicular to the said edges, means for deriving a stepped wave from the said plate, means controlled by the stepped wave for generating a pulse code of one type in response to an increase in the amplitude of the stepped wave, and means controlled by the stepped wave for generating a pulse code of a different type in response to a decrease in the amplitude of the stepped wave.

The invention will be described with reference to the accompanying drawings, in which.

Figure 1:
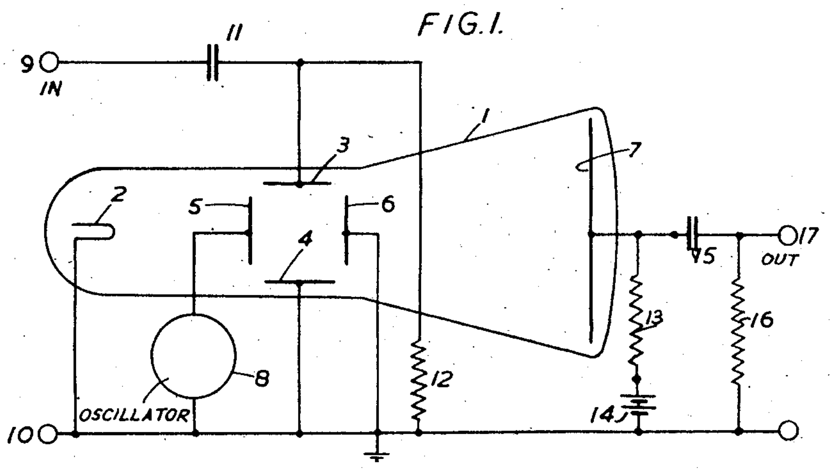
Fig. 1 is a schematic circuit diagram of a simple form of pulse code transmitter for a system according to the invention.
Figure 2:
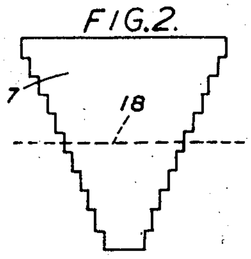
Fig. 2 is a detail of a cathode ray tube used in Fig. 1.
Figure 3:
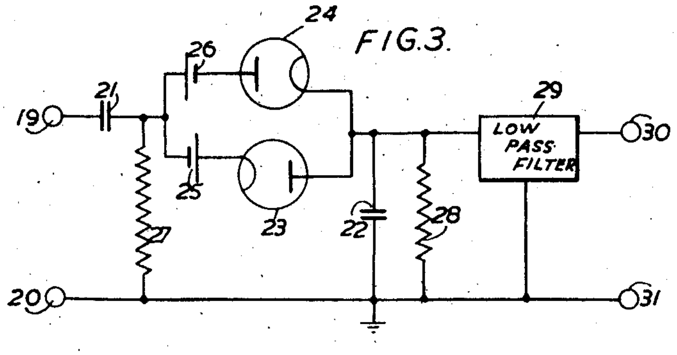
Fig. 3 is a schematic circuit diagram of a simple integrator for reconstituting the signal wave at the receiver from the code pulses.

Figs. 1, 2 and 3 disclose an application of the invention in probably its simplest form, to a single communication channel. In Fig. 1 is shown the code pulse transmitter consisting of a cathode ray tube 1 arranged as an amplitude stepper. This tube is shown diagrammatically and may take any suitable known form. The tube includes a cathode 2 which is the source of the electron beam, the usual set of four deflecting plates 3, 4, 5 and 6 (which are shown turned through 90° from their usual positions in the tube for clearness) and a collector plate 7 on which the electron beam impinges. This plate has the special shape shown in Fig. 2, which will be explained later. The tube will be provided with other suitably polarised electrodes (not shown) for generating and shaping the electron beam according to known practice. The beam should, however, be focussed to a sharp and small spot on the plate 7. The cathode 1, and one plate 4, 6 from each pair of deflecting plates are connected to ground. The horizontally deflecting plate 5 is connected to ground through an oscillator 8 which operates at a frequency high compared with any frequency in the band of signal frequencies that have to be conveyed by the system. This causes the beam to trace a fine line across the collector plate 7.

The signal wave to be transmitted is applied between input terminals 9 and 10, terminal 9 being connected to the vertically deflecting plate 3 through a blocking condenser 11, and terminal 10 being connected to ground. The plate 3 should preferably be connected to ground through a high resistance 12.

The collector plate 7 is connected to ground through a load resistance 13 and a positive polarising source 14 of suitable potential. The resistance 13 is shunted by an integrating condenser 13*a*. The plate 7 is also connected to a differentiating circuit consisting of a small series condenser 15 and shunt resistance 16, one terminal of which is connected to the ground terminal 10, and the other to an output terminal 17, which is connected to the communication circuit which conveys the code pulses.

The collector plate 7 takes the stepped form shown in Fig. 2, the width decreasing in equal horizontal steps from top to bottom. When no input signal voltage is applied at terminal 9, the beam should be arranged to trace a horizontal line 18 across the middle of the plate as shown.

A train of pulses will be generated at the plate 7, and their duration will be proportional to the width of the plate where it is crossed by the line 18. These pulses are integrated by the condenser 13*a*, which will acquire a potential proportional to the pulse duration and therefore to the width of the plate where it is crossed by the beam.

When there is applied to terminal 9 a signal voltage which increases positively from zero, the line 18 traced by the beam will move upwards until it reaches the next step of the plate, when the potential of condenser 13*a* will suddenly increase to a larger value proportional to the width of the plate at that step. As the signal voltage continues to increase, the potential across condenser 13*a* will increase suddenly in equal steps each time the line 18 reaches the next step of the plate 7. Likewise, when the signal voltage decreases and passes through zero and then increases negatively, the line 18 will move downwards across the plate 7 and each time a step is passed, the potential across condenser 13*a* will suddenly decrease in equal steps. The potential variation across the condenser 13*a* will evidently be a stepped version of the signal wave, and the larger the number of steps in the plate 7, the more closely will the signal wave be represented by the potential variation of condenser 13*a*.

The time constant of the elements 13, 13*a* should preferably be just large enough to smooth out the pulses generated by the plate 7. The differentiating circuit 15, 16 may have a somewhat larger time constant.

Fig. 2 shows only 11 steps in the plate 7 for clearness, but in practice it will be necessary to provide a larger number, probably at least 32.

The differentiating circuit 15, 16 will supply to terminal 17 a short positive pulse every time the potential across condenser 13*a* increases by one step, and a similar short negative pulse every time this potential decreases. These short differential pulses are transmitted to the receiver and indicate when the signal amplitude changes to a new value on the amplitude scale, and whether this change is a rise or a fall. From this information, the signal wave can be approximately reconstructed at the receiver, the approximation being the closer, the larger the number of steps in the amplitude scale employed.

The short positive and negative differential pulses thus constitute the simplest possible code for delineating the signal wave. It is obvious that if it is not desired to transmit pulses of both signs, they could be converted into corresponding positive (or negative) pulses, having two different amplitudes, or durations, or into pairs of pulses with different time spacing, or into any other desired pulse code.

While Fig. 2 indicates that the vertical steps of the plate are all equal, so that the steps of the amplitude scale are equal, this is not necessary, and it may in some cases be desirable to use a logarithmic amplitude scale, with smaller steps for small amplitudes than large amplitudes. The vertical steps of the plate 7 can thus be varied in height in a logarithmic or in any other manner.

Fig. 3 shows a simple example of the manner in which the signal wave may be reconstructed at the receiver from the information conveyed by the received positive and negative code pulses.

In Fig. 3 the code pulses are applied between the input terminals 19 and 20, and are applied through a blocking condenser 21 to charge or discharge an integrating condenser 22 through a pair of oppositely directed, parallel connected diodes 23 and 24. These diodes are normally blocked by corresponding bias sources 25 and 26 of appropriate potential, the direct current path being completed by the resistances 27 and 28, of which the resistance 28 should be very high.

It will be seen that the path between the condenser 22 and the input terminal 19 is normally blocked by the diodes, and in the absence of any code pulses, the condenser 22 will have discharged itself through the resistance 28.

As soon as the first code pulse arrives at terminal 19, indicating that the signal amplitude has changed from zero by one step, this pulse, if positive, overcomes the bias of the source 26 and passes through the diode 24, giving a small positive charge to the condenser 22. If the first pulse is negative, it passes through the other diode, and gives the condenser 22 an equal small negative charge. Thus every time the signal amplitude changes by one step, the charge in condenser 22 changes also by one step in the same direction as the amplitude change, and it will be evident therefore, that the variation of the potential of the condenser 22 will be a stepped version of the original signal wave.

It will be clear that after the disappearance of any code pulse, the condenser 22 cannot discharge through either diode provided that the bias sources 25 and 26 are both of higher potential than the maximum potential which the condenser 22 can acquire. The condenser 22 can, however, discharge through the resistance 28 and therefore this resistance should be of such a high value as to produce a time constant with the condenser 22 which is large compared with the period separating any two code pulses. This means that this time constant must be large compared with the period of the lowest frequency component in the signal wave.

The recovered signal wave potential obtained from the condenser 22 is preferably smoothed out by passage through a low pass filter 29, before being applied to the output terminals 30 and 31 to which a telephone receiver (not shown) or other suitable receiving device of circuit may be connected.

It should be added that the signal amplitudes should not be so great that the trace 18 (Fig. 2) moves off the plate 7, and although the deflection sensitivity of the cathode ray tube will naturally be designed in accordance with the expected maximum amplitude of the signal wave it is desired to pass the signal wave through a suitable limiter (not shown) before application to terminal 9, so that any accidental excessive amplitudes will be limited.

It may be added that in Fig. 1, if desired, the oscillator 8, and the plates 5 and 6 and the condenser 13*a* may be omitted, and the electron beam may instead be shaped in the form of an exceedingly thin horizontal blade wide enough to cover the plate 7 at its maximum width. The results obtained will then be substantially the same.

It will be understood that any necessary amplifiers may be inserted at any desired points of the circuits which have been described. Reference to such amplifiers has been omitted for clearness.

Although the invention is applicable to a single channel as just explained with reference to Figs. 1, 2 and 3, it is of much more value when applied to multi-channel systems. The remaining figures show the invention applied to a four channel system, but it will be understood that it is not limited to four channels.

Figure 4:
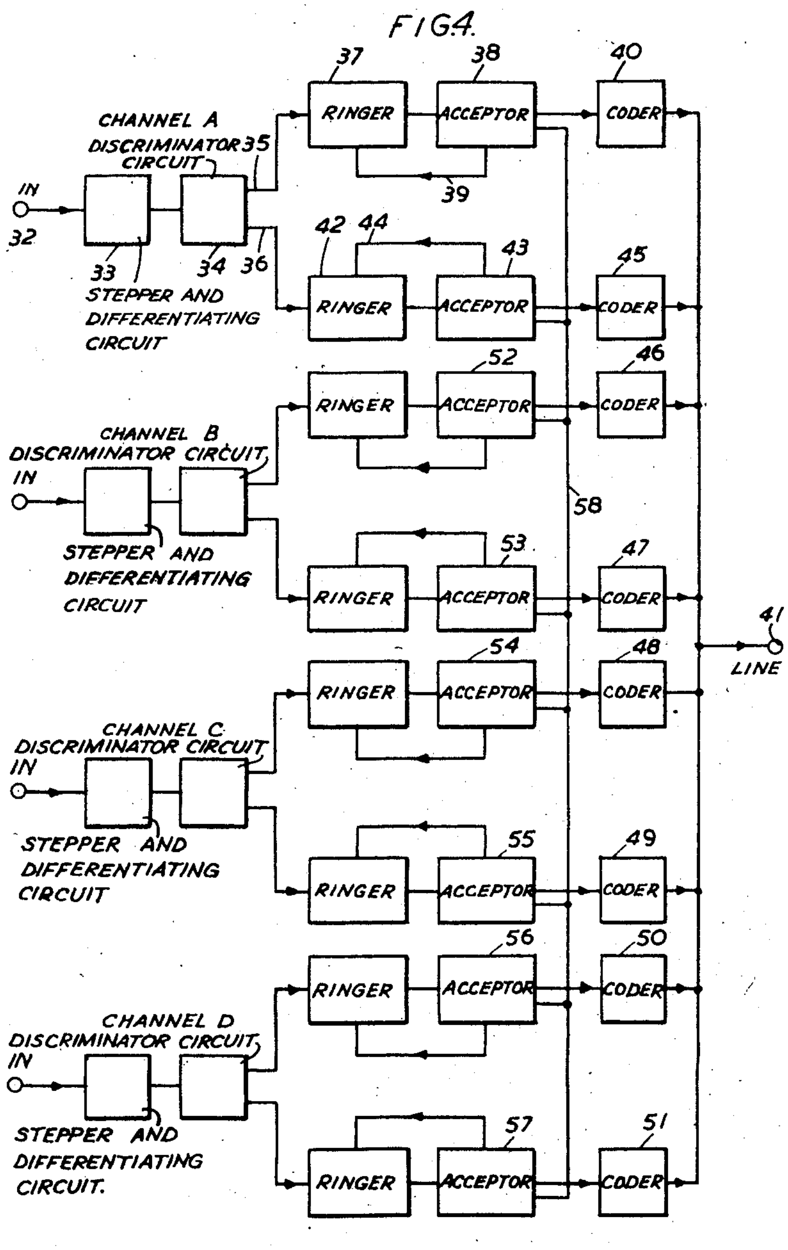
Fig. 4 is a block schematic circuit diagram of the transmitting terminal of a multichannel pulse code modulation system according to the invention.

Fig. 4 is a block schematic circuit diagram of a four-channel transmitter according to the invention. The apparatus for each channel is similar, and that for channel A will be described in detail. The signal wave will be applied to the channel input terminal 32 and thence to a stepper and differentiating circuit 33, which may be that described with reference to Figs. 1 and 2. The short positive and negative code pulses obtained from the output of the circuit 33 are applied to a discriminator circuit 34 which comprises an arrangement of amplitude limiting valves so disposed as to produce a short positive output pulse at an output terminal 35 in response to a positive code pulse, and a similar short positive output pulse at a second output terminal 36, in response to a negative code pulse. An example of such a discriminating circuit is described hereinafter with reference to Fig. 5.

The pulse appearing at terminal 35 corresponds to an increase in the signal amplitude, and is applied to trigger a circuit 37 which is connected to an acceptor circuit 38. An example of such circuits 37 and 38 is described hereinafter with reference to Fig. 6. The circuit 37 generates a train of pulses each of which attempts to operate the acceptor circuit for the purpose of transmitting to the line or other transmission medium a group of code pulses which indicates that an increase in signal amplitude has occurred in channel A. As will be explained more fully later, the acceptor circuit 38 cannot be operated if one of the acceptor circuits associated with another channel is operated.

The circuit 37 will accordingly be called a ringer circuit by analogy with conventional telephone operation, since it is the means by which a request is made for use of the line for transmitting the corresponding code pulses. The acceptor circuit 38 corresponds to the telephone operator.

When the acceptor circuit 38 responds, it transmits a pulse over conductor 39 back to the ringer circuit and stops its operation. The acceptor circuit also transmits a pulse to the coder 40, which generates the appropriate code groups of pulses which are sent out to the line which will be connected to the output terminal 41.

The pulse appearing at terminal 36 of the discriminator circuit 34 corresponds to a decrease in the signal amplitude, and is applied to a ringer circuit 42 connected to an acceptor circuit 43 which stops the ringer over conductor 44, and operates the coder 45. All the devices 42, 43, 44, 45 are respectively the same as the devices 37, 38, 39 and 40, except that the coder 45 is designed to send out a different code group from the coder 40, signifying that a decrease instead of an increase in signal amplitude has occurred in channel A.

Channels B, C and D are all equipped with exactly similar apparatus to channel A, except that the coders 46 to 51 are respectively designed to send out different code groups of pulses respectively characterising increase or decrease of signal amplitude in channels B, C and D.

The eight acceptor circuits 38, 43 and 52 to 57 are all coupled together by a conductor 58 by means of which, if any one acceptor circuit has been operated, all the others are prevented from operating. The manner in which this may be done will be explained later.

It is obvious that a large number of different types of pulse code might be used for identifying the channels and the direction of the signal amplitude change. A simple binary code is, however, preferred. Since eight different indications must be transmitted, a code group which consists of from zero to three successive pulses would normally be sufficient. However, since the code groups are transmitted at irregular times, it is necessary to prefix the group with a fourth pulse which corresponds to the essential starting pulse used in the teleprinter code. Thus the code comprises from one to four closely spaced pulses, there being always a pulse transmitted in the first time position.

The following table gives an example of a binary code which might be used. It is assumed that there are four equally spaced time instants at which a code pulse can occur, which instants are numbered 1 to 4 in the table, and the letter P indicates that a pulse is transmitted at the corresponding instant, the letter O indicating no pulses:

| | | Time instant | | | |
|---|---|---|---|---|---|
| | | 1 | 2 | 3 | 4 |
| Channel: | | | | | |
| A | Rise | P | P | P | P |
| | Fall | P | P | P | O |
| B | Rise | P | P | O | P |
| | Fall | P | P | O | O |
| C | Rise | P | O | P | P |
| | Fall | P | O | P | O |
| D | Rise | P | O | O | P |
| | Fall | P | O | O | O |

It is evident that the above code group could be allotted to the channels in any other way.

While a coding arrangment involving a maximum of four pulses is sufficient for a system having four channels, by using five pulses, eight channels could be accommodated by an extension of this code; and sixteen channels could be dealt with by using six pulses, and generally 2 channels would require a code involving $(n+2)$ pulses.

For dealing with more than four channels, the arrangement of Fig. 4 can be extended by equipping all the additional channels with the same apparatus, the conductor 53 being extended to connect all the acceptor circuits together. All the coders will of course be designated to produce codes involving one or more additional pulses.

Figure 5:
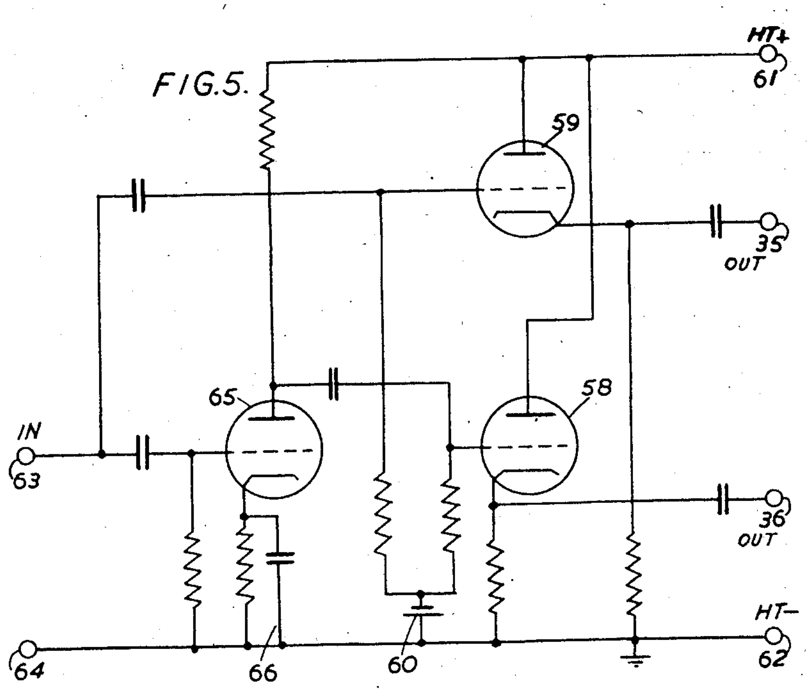
Fig. 5 is a schematic circuit diagram of an example of a pulse discriminator used in Fig. 4.

Fig. 5 shows one form which the pulse discriminator 34 may take. It comprises two similar valves 58 and 59 arranged as cathode followers and biassed beyond the cut-off by means of a suitable negative source 60 to which the control grids are connected. The operating source of potential (not shown) for the anodes of the valves will be connected to terminals 61 and 62. The positive or negative pulses from the stepper and differentiating circuit 33 (Fig. 1) are applied to the input terminals 63 and 64. Terminal 63 is connected directly to the control grid of the valve 59, and through a reversing valve 65 to the control grid of the valve 58. The reversing valve is normally conducting and is suitably biased by means of a convention cathode bias network 66. The auxiliary circuit elements shown in Fig. 5, but not designated, are conventional, and need not be described.

It will be seen that when a positive pulse is applied at terminal 63, the valve 59 will be unblocked, and a positive output pulse will be obtained from terminal 35 connected to the cathode of the valve. The input pulse will be reversed by the valve 65 and will be applied as a negative pulse from the anode to the control grid of valve 58 which is already blocked, and no effect is produced.

When a negative pulse is applied at terminal 63, it is clear that the valve 59 will be unaffected and no output will be produced at terminal 35; however, the negative pulse, reversed by the valve 65, will unblock the valve 58, and a positive output pulse will this time be obtained from the output terminal 36 connected to the cathode of the valve 58.

Figure 6:
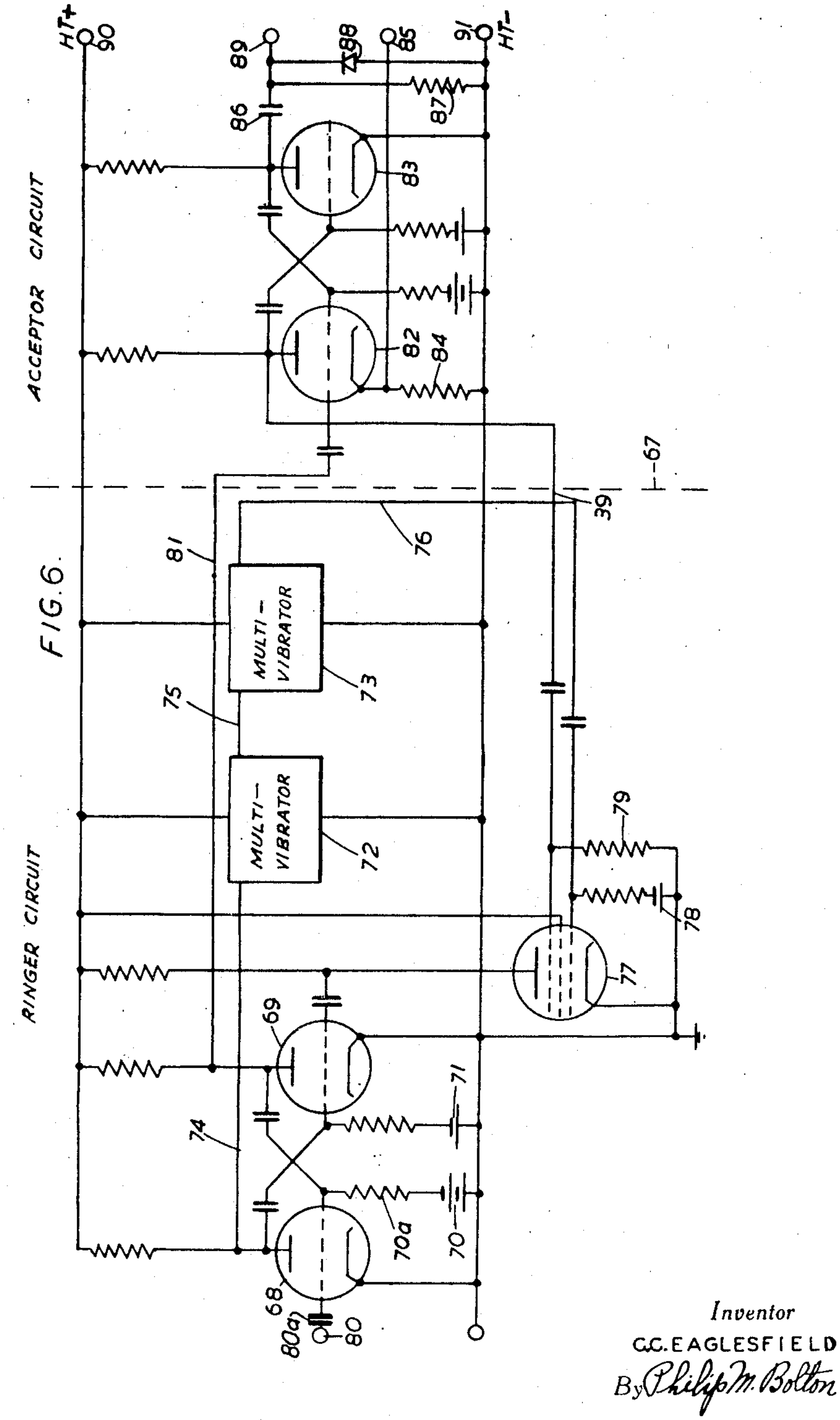
Fig. 6 is a schematic circuit diagram of an example of the ringer and acceptor circuit of Fig. 4.

Fig. 6 shows details of one possible form of the ringer circuit 37 and acceptor circuit 38 shown in Fig. 4. The ringer circuit is on the left hand side of the dotted line 37 in Fig. 6, and the acceptor circuit is on the right hand side of this line.

The ringer circuit comprises three conventional multivibrator trigger circuits each comprising two cross-connected valves, and arranged in a cascade ring, so that each one on being triggered, triggers the next one. The arrangement, once started, operates continuously until stopped by means which will be explained presently.

The first of the three multivibrators comprises two valves 68 and 69 each having the anode connected through a condenser to the control grid of the other in the well known way. The left-hand valve 68 is biassed well beyond the cut-off point by a suitable source 70 connected to the control grid through a resistance 70a, and the right hand valve 69 is given a much smaller bias from a source 71 so that it is in a conducting condition. If a positive pulse of sufficient amplitude is applied to the control grid of the valve 68, the multi-vibrator can be triggered over into the second condition with the valve 69 cut off, and it returns to the first condition after a time, depending on the time constant of the condenser and resistances associated with the control grid of the valve 69. A negative pulse having a duration equal to the time during which the multivibrator remains in the second condition can be obtained from the anode of the valve 68, or a similar positive pulse from the anode of the valve 69. The multivibrator can alternatively be triggered by a negative pulse applied to the control grid of the valve 69.

The blocks 72 and 73 represent two other multivibrators arranged in exactly the same way. The anode of the valve 68 is connected over conductor 74 to the control grid of the left hand valve (not shown) of the multivibrator 72, the anode of which valve is connected by conductor 75 to the control grid of the left hand valve (not shown) of the multivibrator 73. The anode of this last mentioned valve is connected over conductor 76 to the control grid of a gating pentode valve 77 which is biassed to cut off by the source 78. The suppressor grid of the valve 77 is normally maintained at about ground potential by the resistance 79. The anode of the valve 77 is connected to the control grid of the right hand valve 69 of the first multivibrator.

The short positive pulse from the terminal 35 of the discriminator 34 (Fig. 1) is applied to terminal 80, which is connected to the control grid of the left hand valve 68 through a blocking condenser 80a. This pulse should be of sufficient amplitude to trigger the circuit over to the other condition whence it returns, generating negative ringer pulse at the anode of the valve 68. The positive going trailing edge of this negative pulse then triggers the multivibrator 72, which generates a second negative pulse, the trailing edge of which triggers the third multivibrator 73 in the same way to generate a third negative pulse which passes through, and is reversed by the gating valve 77. The negative going trailing edge of the reversed pulse is applied to the control grid of the right hand valve 69, and triggers the first multivibrator again, and the process is repeated indefinitely. The anode of the valve 69 thus generates a train of positive ringer pulses, which are applied to the acceptor circuit over conductor 81.

The three multivibrators are thus arranged effectively in a ring so that each is triggered by the trailing edge of a pulse generated by the preceding one in the ring. It will be understood, of course, that according to the usual practice, the pulse will preferably be differentiated, the following multivibrator being triggered by the differential pulse corresponding to the trailing edge. The differentiating operation may conveniently be effected by suitably choosing the time constant of the elements corresponding to 70*a* and 80*a* in each multivibrator so that no additional elements actually have to be provided.

In the case of a four-channel system such as that described with reference to Fig. 4, the negative and positive ringer pulses generated by the valves 68 and 69 might, for example, have a duration of 10 microseconds while those generated by the multivibrators 72 and 73 might for example each be 12½ microseconds, making a total gap of 25 microseconds between any two ringer pulses.

The acceptor circuit consists of another multivibrator including two valves 82 and 83 arranged exactly in the same way as the valves 68 and 69, except that a resistance 84 is connected in series with the conductor connecting the cathode of the left hand valve 82 to ground, this valve being the one which is normally cut off. This cathode is also connected to a terminal 85 to which is connected the common conductor 58 which is shown in Fig. 4, as coupling all the acceptor circuits together.

If no other acceptor circuit has been operated, then a pulse received over conductor 81 will trigger the acceptor circuit shown in Fig. 6, over to the second condition, and the time constant of the circuit associated with the grid of valve 83 should be chosen so that it remains in this condition for a period slightly longer than the period between two pulses generated by the valve 69. A negative pulse having this duration is generated by the anode of the valve 82, and is supplied over conductor 39 to the suppressor grid of the gating valve 77, and should be of sufficient amplitude to cut off the anode current. This will stop the next pulse produced by the multivibrator 73, thereby stopping the operation of the ringer circuit, since the first multivibrator will not be re-triggered.

It will be noted that as soon as the acceptor circuit multivibrator is triggered into the second condition, the valve 82 conducts, and the cathode potential rises on account of the presence of the resistance 84, and a positive bias potential is accordingly applied to the cathode of the first valve of every other acceptor circuit in Fig. 4 over the common conductor 58. This additional bias causes all these acceptor circuits to require a higher triggering voltage and the amplitude of the triggering pulse supplied over conductor 81 should therefore be chosen so that it cannot trigger an acceptor circuit when it has applied to it the extra bias produced by the operation of another acceptor circuit. This ensures that only one code group can be transmitted at a time, and it will be seen that the ringer circuit will make repeated attempts to operate the acceptor circuit until the latter is released by the return to normal of the already operated acceptor circuit.

The anode of the valve 83 will generate a relatively long positive pulse which is differentiated by the circuit comprising the series condenser 86 and the shunt resistance 87, and the unwanted negative differential pulse corresponding to the trailing edge is removed by the rectifier 88 shunting the resistance 87. The positive differential pulse corresponding to the leading edge is supplied to the output terminal 89 and thence to the coder 40 (Fig. 4).

It should be explained that after a multivibrator circuit has returned to the first condition after having been triggered, it remains for some time in an insensitive condition during which it cannot be triggered again. Three multivibrators are shown in the ringer chain in order to give time for each to recover before it is due to be triggered again. Possibly the third multivibrator 73 might be omitted, or in other circumstances, a fourth one might be necessary. In any case, the duration of the pulse generated by the acceptor should be slightly greater than one complete period of operation of the ringer, in order to ensure that the gating valve shall be blocked long enough to be sure of stopping the re-triggering pulse from the output of the last multivibrator in the chain. In accordance with the figures given for the ringer circuit, the acceptor pulse might, for example, have a duration of 50 microseconds.

Since Fig. 6 is made up of a collection of conventional circuits it is not necessary to describe in detail all the auxiliary elements shown, but not designated. It will merely be stated that the terminals 90 and 91 are for the positive and negative terminals of the high tension source (not shown) for the valves in the circuits.

Figure 7:
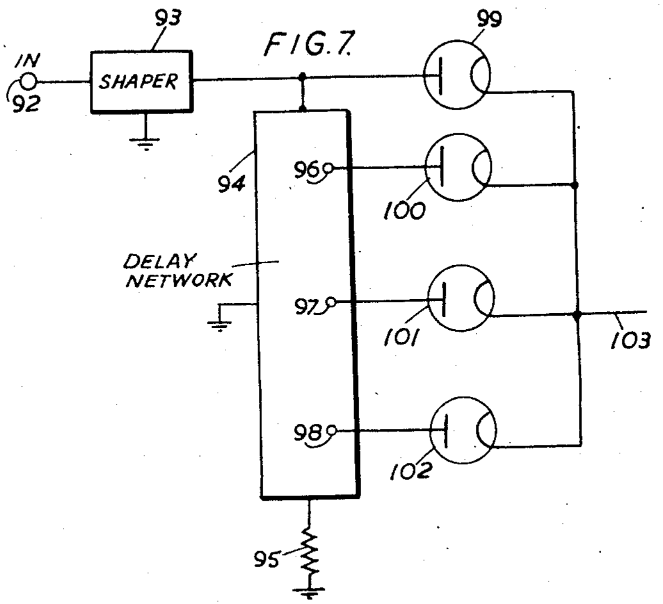
Fig. 7 is a detailed diagram of one form of a simple coder which may be used in Fig. 4.

Fig. 7 shows details of a simple form for any of the coders shown in Fig. 4. Positive pulses from the corresponding acceptor are supplied at terminal 92 connected to a shaping circuit 93 designed to produce a code pulse of the required duration and amplitude. The shaping circuit could be a multivibrator similar to one of those shown in Fig. 6. The positive pulses from the shaper 93 are applied to the input of a delay network 94 of well known type which may, for example, consist of a number of similar meshes consisting of series inductances and shunt condensers. This network is terminated at the output end by a resistance 95 equal to the characteristic impedance of the network, to prevent pulses from being reflected from the end. Three taps 96, 97 and 98 are provided on the network at points from which pulses may be obtained delayed respectively $t_1$, $t_2$ and $t_3$ microseconds after the input pulses. The undelayed pulses and the delayed pulses from the taps 96, 97 and 98 are applied through buffer diodes 99, 100, 101, and 102 to a common conductor 103 connected to the line terminal 41 (Fig. 4).

The arrangement of Fig. 7 is suitable for the coder 40 of Fig. 4 which has to deliver four code pulses to the line (see the code table given earlier in this specification). For the other coders, one or more of the connections to the taps 96, 97 and 98, and the corresponding diodes, will be omitted, according to the table.

Thus for example, in the case of coder 43, which corresponds to a signal amplitude increase in channel C, the diode 100 and the corresponding connection to tap 96 will be omitted; for coder 47 diodes 101 and 102 will be omitted; for coder 51, diodes 100, 101 and 102 will all be omitted.

Preferably, though not essentially, the code pulses will be transmitted at equal time intervals so that $t_2=2t_1$, and $t_3=3t_1$.

Figure 8:
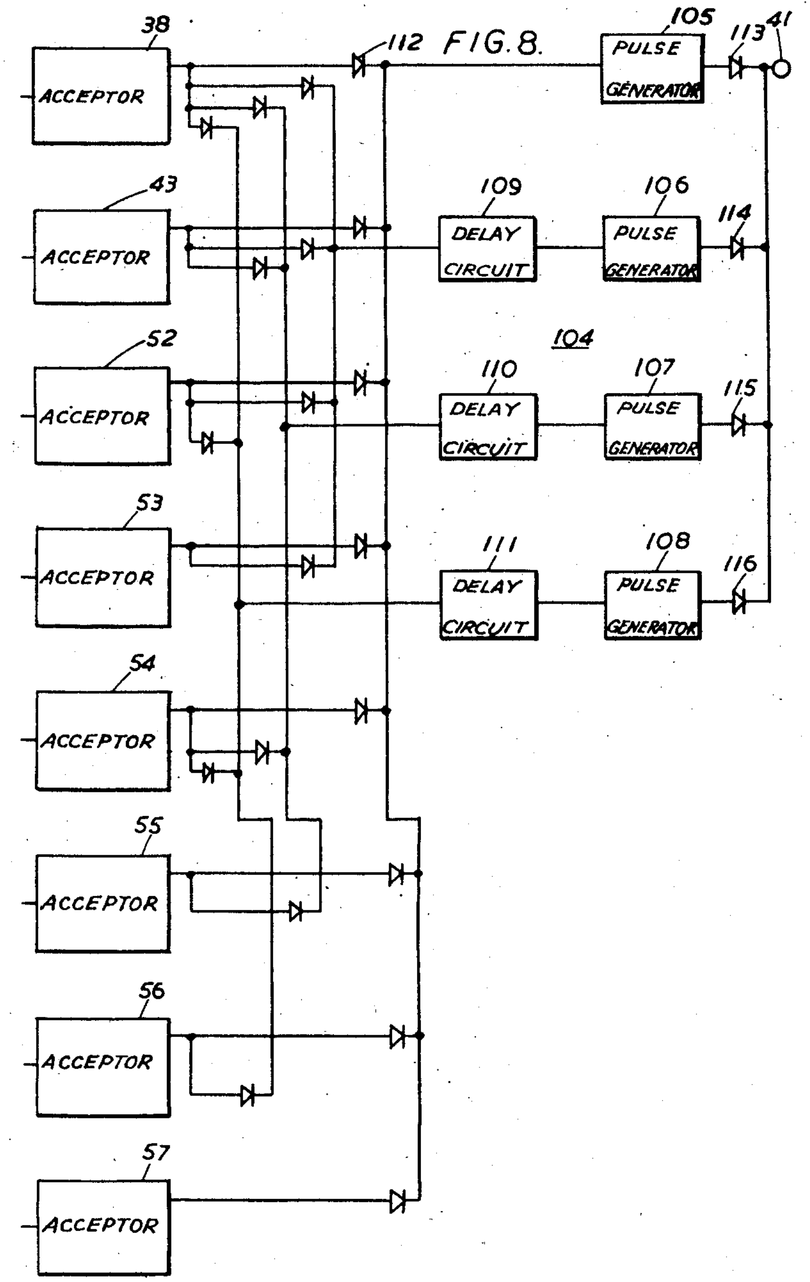
Fig. 8 is a diagram of a modification of Fig. 4.

In the arrangement of Fig. 4, each channel is provided with two separate coders. However, as shown in Fig. 8, the arrangement may be simplified by providing a single coder common to all the channels. Fig. 8 shows the eight acceptor circuits 38, 43 and 52 to 57 of Fig. 4, it being understood that the apparatus to the left-hand side of these acceptor circuits is the same as shown in Fig. 4 and is accordingly omitted.

The single coder 104 of Fig. 8 comprises four parallel circuits containing respectively pulse generators 105, 106, 107 and 108, all of which are alike, and may be similar to the multivibrator comprising the valves 68 and 69 shown in Fig. 6. Each generator should be designed to produce a single pulse in response to each input pulse, having the desired duration and amplitude for the code pulses. The generators 106, 107 and 108 are preceded by delay devices 109, 110 and 111; each of which may be similar to the same multivibrator, which should be designed to produce a negative pulse of suitable duration from the anode of the valve 68, the positive going trailing edge of which triggers the corresponding pulse generator 106, 107 or 108. The pulses produced by the devices 109, 110 and 111 should have durations $t_1$, $t_2$, and $t_3$.

The pulse generator 105 is not preceded by a delay device, so if the four generators 105, 106, 107 and 108 are all triggered by an acceptor circuit, they will produce four similar code pulses in succession spaced at intervals of $t_1$, $(t_2-t_1)$ and $(t_3-t_2)$. These code pulses will be equally spaced if $t_2=2t_1$, and $t_3=3t_1$.

If the pulse generators are similar to the multivibrator including the valves 68 and 69, the desired positive code pulses may be obtained for the anode of the second valve, and the time constants of the associated condenser and resistance circuits may be chosen to give these pulses the desired duration.

The output of each of the eight acceptor circuits is connected in parallel to one or more of the four parallel branches of the coder 104, according to the code which is to be sent out. Thus the acceptor circuit 38, which produces a pulse for an amplitude increase on channel A, is connected to all the branches, since four code pulses are required according to the first line of the table given above. The acceptor circuit 52, which produces a pulse for an amplitude decrease on channel D, is connected only to the first branch which contains the generator 105, since only the first code pulse is required in this case.

Likewise, for example, acceptor circuit 55 is connected only to the first and third branches, and acceptor circuit 52 to the first, second and fourth branches, corresponding to an amplitude decrease on channel C, and an amplitude increase on channel B, respectively, according to the table.

In order to prevent all the branches from being permanently connected together all connections from the acceptor circuits include buffer rectifiers such as 112 which are directed so as to conduct positive pulses from the acceptor circuit to the corresponding branch. The rectifiers may consist of diodes, for example.

The pulses generated by the four generators 105 to 108 are supplied through buffer rectifiers or diodes 113, 114, 115 and 116 to the common output terminal 41.

It will be understood that when there are more than four channels in the system, so that one or more additional pulses are required for the code, one or more additional taps will be provided in the delay network of Fig. 7 with corresponding buffer diodes, or one or more additional parallel circuits in Fig. 8, similar to the others, but introducing greater delays.

The duration and spacing of the code pulses which should be chosen depends among other considerations on the number of channels to be served. For a four-channel system, the code pulses might for example, have a duration of 5 microseconds, and be spaced 5 microseconds apart.

The ringer circuits might then be designed to generate pulses having a duration of 10 microseconds spaced 25 microseconds apart, in which case the pulse generated by the acceptor circuit for stopping the ringer should have a duration of about 50 microseconds. This means that adjacent code groups of pulses could not be closer than 50 microseconds.

Figure 9:
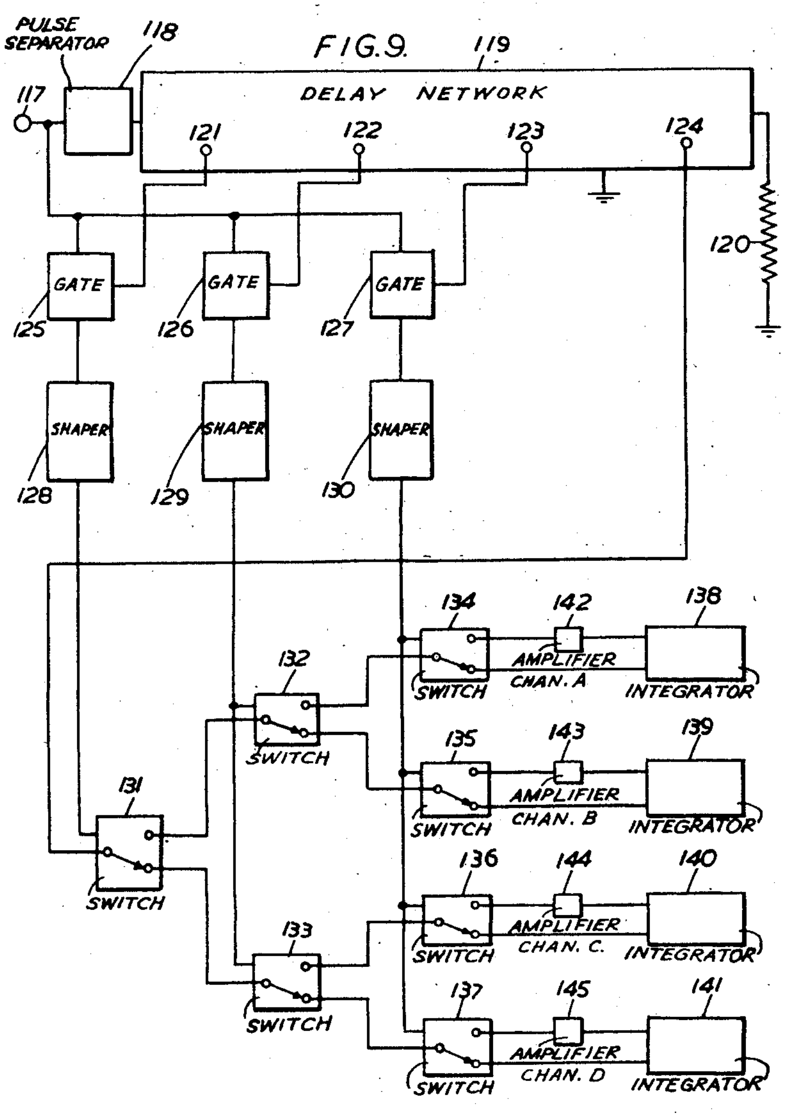
Fig. 9 is a block schematic circuit diagram of the receiving terminal of the system.

In Fig. 9 is shown an example of the manner in which the code groups of pulses may be used at the receiver to build up the signal waves in each channel. It is necessary to separate the pulses of each code group and to direct them into different channels where they control a system of electronic switches by means of which an activating pulse is directed to the appropriate channel receiving apparatus.

The code group received from the line or other communication medium is applied to an input terminal 117 connected through a pulse separator 118 to the input of a delay network 119, the output terminals of which are connected to a terminating resistance 120, equal to the characteristic impedance of the network.

The pulse separator 118 is designed to select the first pulse of each group, excluding the remaining pulses, and to pass it to the delay network. The separator 118 may, for example, consist of a multivibrator similar to that shown in Fig. 6, comprising the valves 68 and 69, a positive output pulse being taken from the anode of the valve 69. As already stated, this type of circuit remains insensitive to a second triggering for a period which depends on the time constant of the circuit connected to the control grid of the valve 68, and this time constant may be chosen so that the multivibrator cannot be triggered again by any of the following pulses of the code group.

The delay network 119 has four tapping points 121, 122, 123 and 124, the first three of which are spaced so that gating pulses may be respectively obtained therefrom at times synchronising with the three later code pulses. A fourth still later activating pulse is obtained from the tapping 124.

The gating pulses are respectively applied to three gating circuits 125, 126 and 127, to which the code pulses are also applied directly from terminal 117. In this way the three later code pulses, if present, are selected and are separately supplied to corresponding shaping circuits 128, 129 and 130. These circuits are designed to lengthen the selected code pulses by different amounts so that each of them overlaps the activating pulse obtained from the tapping point 124 of the delay network. Thus, if the three later code pulses occur at times $t_1$, $t_2$ and $t_3$ after the first code pulse, and if the activating pulse occurs at a time $t_4$ thereafter, then the three code pulses obtained from gate circuits 125, 126 and 127 should respectively be given durations slightly in excess of $(t_4-t_1)$, $(t_4-t_2)$, and $(t_4-t_3)$ respectively.

The lower part of Fig. 9, includes 7 two-way electronic switches connected in pyramid formation. The first of these switches 131 is connected to the tapping point 124 and directs the activating pulse to either of switches 132 and 133. Switches 132 and 133 direct the activating pulse to either of switches 134 and 135, and 136 and 137, respectively. The last four switches respectively correspond to the channels A, B, C and D and the two output terminals of each of these switches are connected to a corresponding channel integrator 138, 139, 140 or 141, the upper connection being through a pulse inverting amplifier 142, 143, 144 or 145, used to convert the negative activating pulse obtained from the switch into a positive pulse. In the lower connections a negative pulse is required.

The switches are all normally in the downward position as indicated. The switch 131 is activated by the lengthened pulse corresponding to the second code pulse, switches 132 and 133 are jointly controlled by the lengthened pulse corresponding to the third code pulse; and switches 134, 135, 136 and 137 are jointly controlled by the lengthened pulse corresponding to the fourth code pulse. When a control pulse is applied to any switch, it operates it to the upward position. Thus it will be seen that by the time that the activating pulse reaches the switch 131, any of the code pulses which are present will have held operated the corresponding switch or switches. Thus in the case of an increase of signal amplitude in channel A, all of the code pulses are present, so that all the switches will be operated to the upward position. The activating pulse is therefore directed through switches 131, 132 and 134 to the upper input terminal of the integrator 138, where it appears as a positive pulse. If the last code pulse had been absent, indicating a decrease in signal amplitude in channel A, the four switches 134 to 137 would not be operated, and the activating pulse would then be directed to the lower input terminals of the integrator 139, where it appears as a negative pulse.

To take another example, if the second of the four code pulses is missing, indicating an increase of signal amplitude in channel C, then all the switches except 131 will be operated, and the activating pulse will be directed through switches 131, 133 and 136 to the upper terminal of the integrator 140.

The pulse lengthening or shaping circuits 128, 129 and 130 can each comprise a multivibrator similar to that including the valves 68 and 69 of Fig. 6, with the time constants suitably chosen to give pulses of the required duration, the output pulses being taken from the anode of the valve 69.

Figure 10:
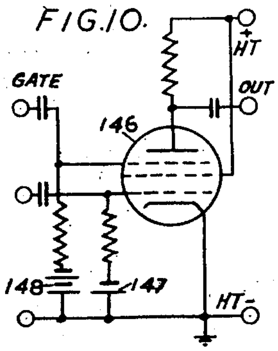
Fig. 10 is a schematic circuit diagram of an example of a gating circuit used in Fig. 9.

Fig. 10 shows a suitable form for the gating circuits 125, 126 and 127. It comprises a pentode valve 146 arranged somewhat similarly to the valve 77 of Fig. 6, with the control grid biassed beyond the cut off by means of a suitable source 147. Positive pulses from the delay network are applied to unblock the valve to produce negative output pulses at the anode. However, the suppressor grid is also biassed to a relatively high negative potential by a source 148 so that it would normally cut off the anode current produced by an input pulse. The positive gating pulses from the delay network are applied to the suppressor grid to permit anode current to flow when an input positive pulse synchronises with the gating pulse, thereby producing a negative output pulse which is applied to the valve 69 of the lengthening circuit, as in Fig. 6.

Figure 11:
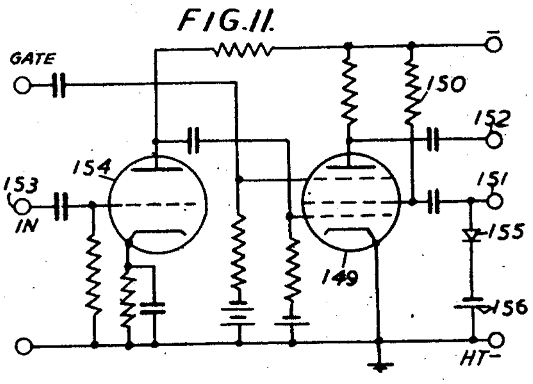
Fig. 11 is a schematic circuit diagram of an example of an electronic switch used in Fig. 9.

In Fig. 11 is shown an example of an electronic switch suitable for the switches 132 to 137 of Fig. 9. A pentode valve 149 is arranged similarly to the valve 146 of Fig. 10, except that the screen grid is provided with a load resistance 150 and is connected to an output terminal 151. The anode is connected to an output terminal 152. The input pulse is in this case applied from the input terminal 153 to the control grid of the valve 149 through an inverting amplifier valve 154, since this pulse comes from a preceding switch which produces negative pulses at the output. The inverting valve 154 applies a positive pulse to the control grid of the valve 149, and when no control pulse is applied to the suppressor grid, a negative pulse will be obtained from the output terminal 151 connected to the screen grid, since the suppressor grid is negatively biassed and cuts off the anode current. When a positive control pulse from the corresponding one of the lengthening circuits 129, 130 is applied to the suppressor grid, it transfers the greater part of the space current to the anode, and a negative output pulse will be obtained from terminal 152 instead of from terminal 151.

However, a much smaller negative pulse will also be obtained from the screen grid, at terminal 151, and in order to cut this off, a rectifier 155 in series with a biassing source 156 is connected between terminal 151 and ground. The rectifier is directed, as shown, so that it will be blocked when the electrode connected to terminal 151 is negative to the other electrode. The source 156 has its positive terminal connected to ground so that it biasses the rectifier in the conducting direction. The potential of the source 156 should be greater than that of the small negative output pulse which appears on the screen grid when a positive control pulse is applied to the suppressor grid, but less than that of the large negative output pulse which appears on the screen grid in the absence of the control pulse. The large pulse will accordingly block the rectifier 155 and will appear at terminal 151, but the small pulse cannot do this, and will therefore be shunted away through the rectifier, and so will be eliminated.

The terminals 151 and 152 are respectively the lower and upper terminals of the switches shown in block form in Fig. 9. As positive pulses are required to be supplied to the upper terminals of the integrators 138 to 141, the inverting amplifiers 142 to 145 have to be provided as shown.

In the case of switch 131, the input activating pulse is already positive, so this switch should be as Fig. 11 with the inverting valve 154 omitted, the input terminal 153 being then connected directly to the control grid of the switching valve 149.

Figure 12:
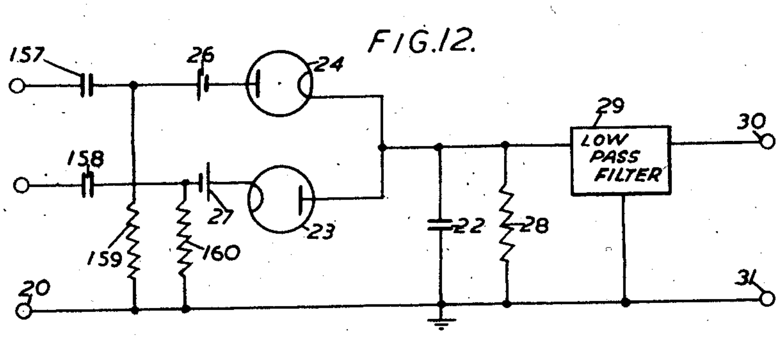
Fig. 12 is a schematic circuit diagram of an example of an integrating circuit used in Fig. 9.

The integrating circuits 138 to 141 may be as shown in Fig. 12, which is a slight modification of Fig. 3. The modification consists in replacing the input terminal 19 by two input terminals separately connected to the sources 26 and 27 through condensers 157 and 158, with separate leak resistances 159 and 160 replacing the single resistance 27. The operation is the same as before, a positive activating pulse in response to a code group passing through terminal 155 and diode 24 to charge the condenser 22 positively, and a negative activating pulse in response to a different code group passing through terminal 156 and diode 23 to charge the condenser negatively, so that the signal wave is built up in the condenser exactly as before, and is smoothed by the low pass filter 29 and applied to the telephone circuit connected to terminals 30 and 31.

Referring again to Fig. 9, if there are more than four channels, the pyramid arrangement of electronic switches will be extended by providing one or more additional banks which will be respectively controlled by one or more additional code pulses. Corresponding extra taps will be provided on the delay network 119 between the taps 123 and 124 (so that the activating pulse is always produced after the last code pulse), together with extra gate and shaper circuits.

Thus eight additional switches, all controlled by a fifth code pulse and connected in pairs to the switches 134 to 137 will provide for a total of eight channels: sixteen more switches controlled by a sixth code pulse will provide for a total of sixteen channels, and generally, $2^{(n-1)}-1$, switches controlled by $n2$ code pulses will provide for a total of $2n$ channels.

Figure 14:
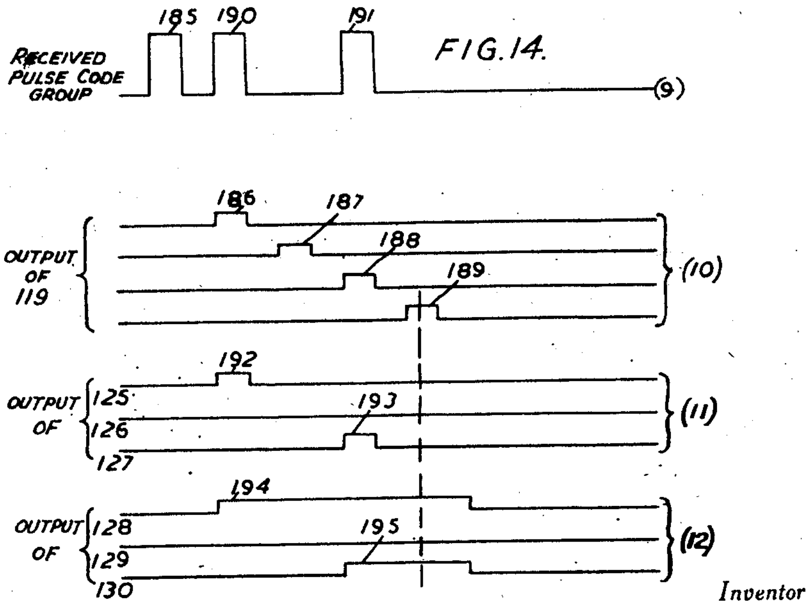
Figs. 13, 14 and 15 are pulse diagrams used in explaining the operation of the system.
Figure 13:
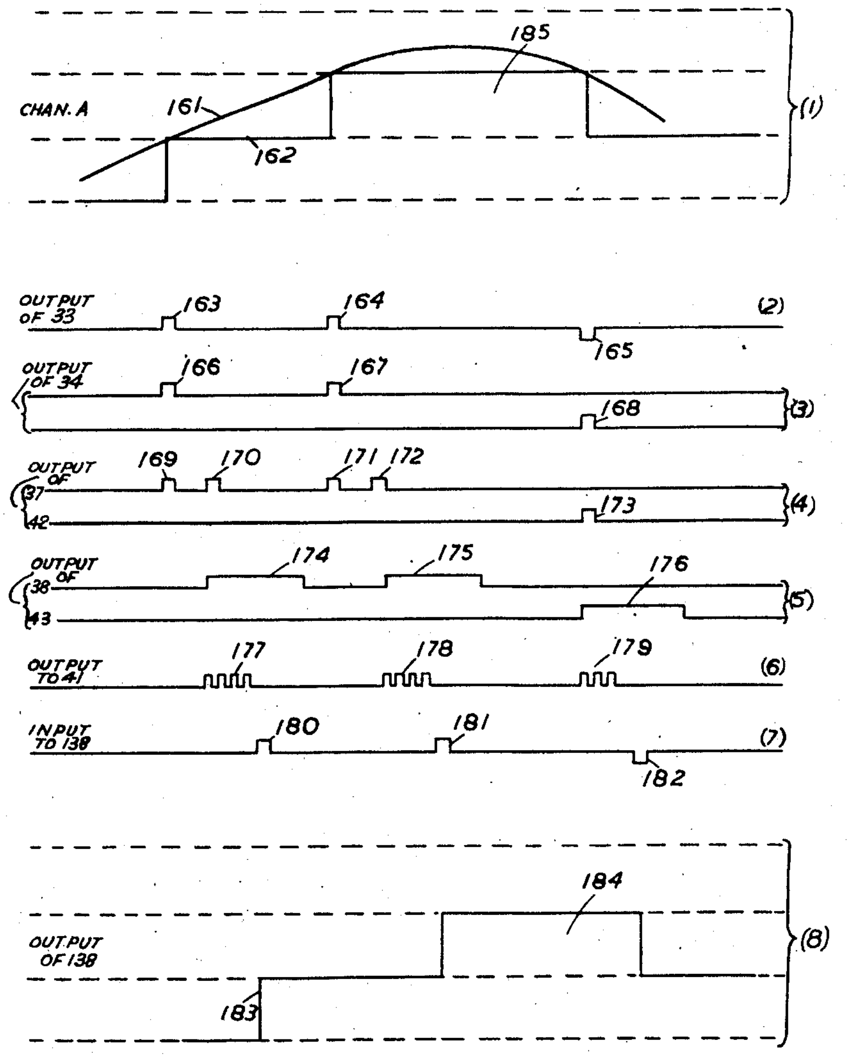
Figure 15:
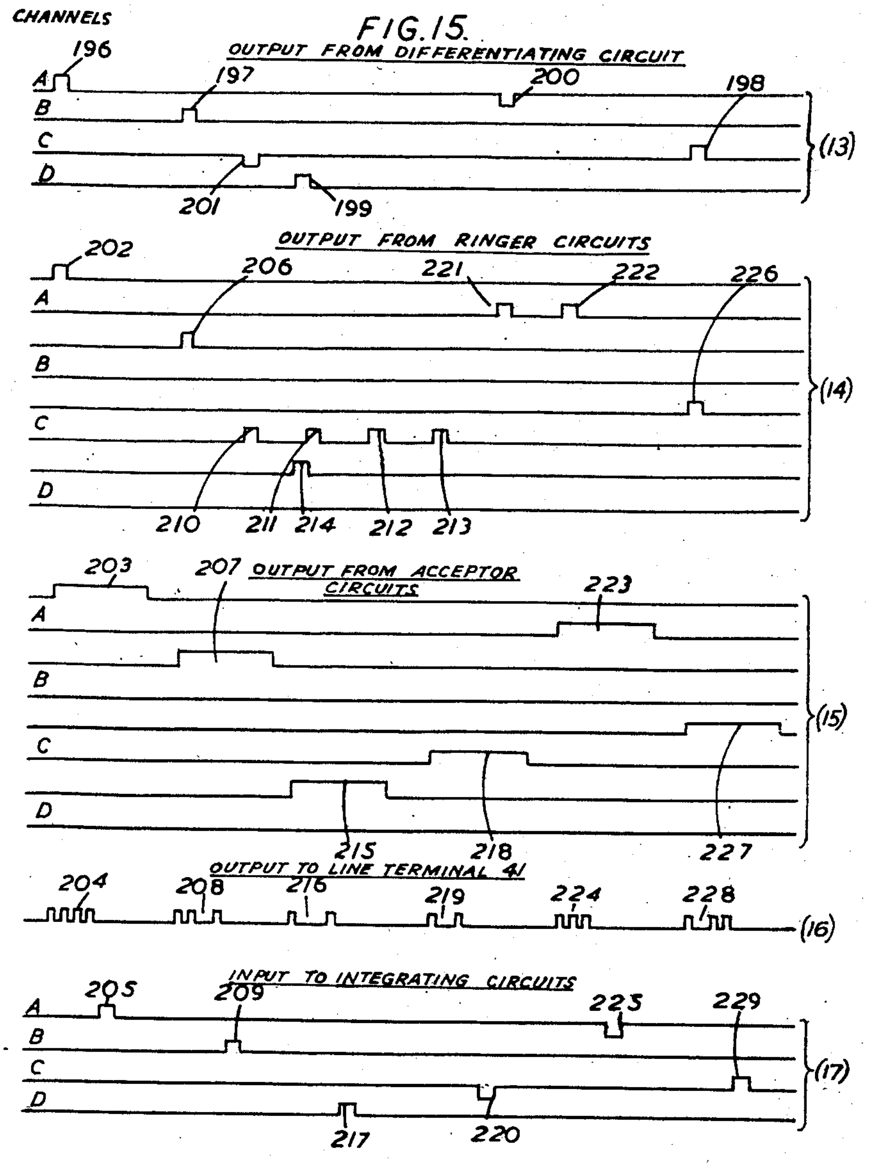

In order to make clearer the manner in which the system of Figs. 4 to 12, operates the diagrams of Figs. 13, 14 and 15 have been prepared.

In Fig. 13, the operations in channel A have been chosen as an example. In curve 1 of Fig. 13, there is shown at 161 a portion of the signal wave applied to terminal 9 (Fig. 1) of the stepper circuit 33 (Fig. 4). The corresponding stepped wave generated in the condenser 13a connected to the plate 7 of the cathode ray tube 1 (Fig. 1) is shown at 162. The differential pulses obtained at the output terminal 15 (Fig. 1) of the stepper and differentiating circuit 33 (Fig. 4) are shown by curve 2 of Fig. 13. The first two of these differential pulses 163 and 164 are positive, corresponding to the first two upward steps of the curve 162. The third differential pulse 165 is negative corresponding to the third downward step of the curve 162.

Curve 3 shows the corresponding positive output pulses 166 and 167 obtained at terminal 35 of the discriminating circuit 34 (Fig. 4) and the positive output pulse 168 which corresponds to the negative pulse 165 and appears at the output terminal 36.

The pulse 166 operates the ringer circuit 37 (Fig. 4) and it is assumed that the corresponding acceptor circuit 38 is temporarily blocked over conductor 58 owing to the operation of another acceptor circuit, as previously explained. The ringer circuit therefore generates two pulses 169 and 170, curve 4, the second of which finds the acceptor circuit unblocked and operates it so that no more pulses are produced by the ringer circuit. Likewise the pulse 167 operates the ringer circuit 37 which again produces two pulses 171, 172 for the same reason.

The pulse 168, however, operates the ringer 42 which finding the acceptor 43 unblocked, generates a single pulse 173. Curve 5 shows the corresponding much longer pulses 174 and 175 produced by the acceptor circuit 38 in response to the pulses 170 and 172, and the pulse 176 produced by the acceptor circuit 43 in response to the pulse 173.

Curve 6 shows the groups 177 and 178 of four code pulses produced by the coder 40 in response to the acceptor pulses 174 and 175 respectively, which correspond to a rise in the signal amplitude of channel A, according to the first line of the table given above. The group 179 of three code pulses is produced by the coder 45 in response to the pulse 176 from the acceptor 43, and corresponds to a fall in the signal amplitude of channel A according to the second line of the table.

It will be noted that owing to the fact that the pulses 166 and 167 had to wait for the line, the pulse groups 177 and 178 are both late, while group 179 is on time.

Curve 7 shows the activating pulses 180, 181, and 182 applied to the integrator 138 in response to the code groups 177, 178 and 179 respectively. Pulses 180 and 181 are positive and are applied to the upper terminal 155 (Fig. 12) of the integrator, while pulse 182 is negative and is applied to the lower terminal 156.

Curve 8 shows the stepped wave 183 built up by the integrator. This is similar to the stepped wave 162 of curve 1, but owing to the fact that the pulse groups 177 and 178 were both late, the duration of the top step 184 is less than that of the corresponding top step 185 of the wave 162. Apart, therefore, from the distortion due to the stepping of the original wave, there will be further distortion as a result of the jostling with some other channel. Accordingly, the pulse durations and the minimum separation of adjacent code groups should be designed in relation to the number of channels to be served, so that this jostling occurs only rarely.

Fig. 14 shows how the code pulses are dealt with at the receiver. Curve 9 shows a typical code group in which the third pulse is missing, and which according to the table signifies an increase of signal amplitude on channel B. The first pulse 185 of the group produces the three gating pulses 186, 187 and 188 and the activating pulse 189 shown in curve 10 from the delay network 119 (Fig. 9). Thus the second and fourth code pulses 190 and 191 are admitted respectively through the gate circuits 125 and 127 by the gating pulses 186 and 188 and appear separately as shown at 192 and 193 in curve 11. There being no third code pulse, there will be no output from the gating circuit 126. The lengthened pulses corresponding to 192 and 193 produced by the shaping circuits 128 and 130 are shown in curve 12 at 194 and 195 and overlap the activating pulse 189, shown in curve 10. Thus the switches 131 and 134 to 137 (Fig. 9) will all be operated as already explained, and the activating pulse will be directed to the upper terminal of the integrator 139.

Fig. 15 shows an example of the manner in which the code groups for all four channels are dealt with when all the channels are operating together. Curve 13 shows the positive or negative pulses which are assumed to be produced at the outputs of the channel stepper and differentiating circuits such as 33 (Fig. 4). The timing of these pulses has been specially chosen to exhibit some of the possible jostling effects which may occur. Thus amplitude increases in channels A, B, C and D are indicated by the positive pulses 196, 197, 198 and 199, and decreases on channels A and C by negative pulses 200 and 201. It will be noticed that the pulses 197, 201 and 199 come close together in time.

Curves 14, 15 and 16 respectively show the pulses produced by the corresponding ringer circuits, acceptor circuits and coders of Fig. 4, while curve 17 shows the pulses applied to the integrators in Fig. 9 by the last bank of switches 134 to 137.

The pulse 196 (curve 13, Fig. 15) causes the ringer 37 to channel A (Fig. 4) to produce the single pulse 202, since the line is unoccupied: the acceptor 38 produces the longer pulse 203 and operates the coder 40 to generate the four code pulses 204. A corresponding positive pulse 205 will be applied to the integrator 138 of Fig. 9. Pulse 197 (curve 13, Fig. 15) produces in turn the pulses 206, 207, 208 and 209, since the acceptor 38 (Fig. 4) will have completed its operation before the acceptor 52 is due to be operated.

However, pulse 201 finds the corresponding acceptor 55 blocked because the acceptor 52 is still operated, so the corresponding channel C ringer starts generating a train of pulses 210 to 213. Curve 14, however, the pulse 199 arrives in channel D between the pulses 210 and 211 and finding that the channel B acceptor 52 has completed its operation, gets the line first and so the pulse 211 finds the corresponding acceptor 55 blocked again and the ringer has to generate two more pulses 212 and 213 before it finds the acceptor 55 unblocked.

The pulse 199 causes the corresponding ringer to generate the pulse 214, and the acceptor 56 produces the pulse 215 and operates the coder 50 to produce the code group 216. The corresponding input pulse to the integrator 141 (Fig. 9) is 217.

From curve 15 of Fig. 15 it can be seen that the acceptor pulse 215 does not terminate until after the third ringer pulse 212 is produced in channel C, so that the fourth pulse 213 can now operate the acceptor 55, which produces the longer pulse 218 and operates the coder 49 to produce the code group 219, in response to which the negative pulse 220 is applied to the integrator 140 (Fig. 9).

It will now be seen from curves 15 and 13 of Fig. 15, that the pulse 218 overlaps the negative pulse 200 in channel A. The corresponding ringer 42 thus has to generate two pulses 221 and 222 before it finds the acceptor 43 unblocked, which then produces in turn the pulses 223, 224 and 225 as before.

The pulse 198 in channel C arrives after the acceptor 42 has completed its operation, and so the pulses 226, 227, 228 and 229 are produced without delay, as previously explained.

It will be seen that on account of the interference of the pulses 197 and 201, the code group 219 is delayed by three ringer periods, and because this code group is late it causes the code group 224 also to be late by one ringer period.

It will be clear from these explanations that although the time intervals between the code pulses of any group are specified, the time at which the first pulse is transmitted is determined by the signal amplitude changes.

It should be mentioned that owing to the irregular transmission of the code groups of pulses, there may tend to be a variation in the amplitudes of the pulses due to the effects of the various condensers through which they pass. Such variations may be removed, if desired, by the use of suitable amplitude limiting arrangements before the code pulses are transmitted over the line or other transmission medium.

It may be added that the multivibrators 72 and 73 shown in Fig. 6 might be replaced by a passive delay network (not shown) of conventional type, and designed to introduce such a delay that the pulses generated by the multivibrator 68, 69 have the desired repetition frequency. If this network does not produce an inversion of the pulses, its input terminal should be connected to the anode of the valve 69 instead of to the anode of the valve 68. Various other modifications within the scope of the invention are evidently possible.

While the principles of the invention have been described above in connection with specific embodiments and particular modifications thereof, it is to be clearly understood that this description is made only by way of example and not as a limitation on the scope of the invention.

What is claimed is:

1. An electric pulse code generator comprising a cathode ray tube having a target plate having two parallel edges, the width of which plate changes progressively in discontinuous steps from one edge of the plate to the opposite edge, means for causing the cathode ray to produce a fine line across the plate parallel to the said edges, means for applying a signal wave to deflect the beam in a direction perpendicular to the said edges, means for deriving a stepped wave from the said plate, means controlled by the stepped wave for generating a code pulse of one type in response to an increase in the amplitude of the stepped wave, and means controlled by the stepped wave for generating a code pulse of a different type in response to a decrease in the amplitude of the stepped wave.

2. In an electrical transmission system for transmitting a signal wave, means controlled by the signal wave to be transmitted for generating a corresponding stepped wave in which a change in amplitude occurs each time the signal wave crosses the boundary between the steps of a predetermined amplitude scale having a limited number of discrete steps, means responsive to each change of one step in the amplitude of said stepped wave for producing a pulse, said means comprising means responsive to an increase of one step in the amplitude of the stepped wave for producing a pulse of one type, means responsive to a decrease of one step in the amplitude of the stepped wave for producing a pulse of another type and means responsive to said pulse of one type for producing a first multi-element pulse code signal and means responsive to said pulse of another type for producing a second multi-element pulse code signal.

3. In an electrical transmission system for transmitting a signal wave, means controlled by the signal wave to be transmitted for generating a corresponding stepped wave in which a change in amplitude occurs each time the signal wave crosses the boundary between the steps of a predetermined amplitude scale having a limited number of discrete steps, means responsive to an increase of one step in the amplitude of the stepped wave for producing a first multi-element pulse code signal and means responsive to a decrease of one step in the amplitude of said stepped wave for producing a second multi-element pulse code signal.

4. An electric pulse code generator comprising a cathode ray tube having a target plate having two parallel edges, the width of which plate changes progressively in discontinuous steps from one edge of the plate to the opposite edge, means for causing the cathode ray to produce a fine line across the plate parallel to the said edges, means for applying a signal wave to deflect the beam in a direction perpendicular to the said edges, means for deriving a stepped wave from the said plate, means responsive to each change of one step in the amplitude of said stepped wave for producing a pulse, said means comprising means responsive to an increase of one step in the amplitude of the stepped wave for producing a pulse of one type, and means responsive to a decrease of one step in the amplitude of the stepped wave for producing a pulse of another type.

CHARLES CECIL EAGLESFIELD.

References Cited in the file of this patent

UNITED STATES PATENTS

| Number | Name | Date |
|---|---|---|
| 2,596,149 | Hilferty | May 13, 1952 |